(12) United States Patent
Hasegawa (10) Patent No.: US 9,390,836 B2
(45) Date of Patent: Jul. 12, 2016

(54) WIRE HARNESS

(71) Applicant: SUMITOMO WIRING SYSTEMS, LTD., Mie (JP)

(72) Inventor: Katsumi Hasegawa, Mie (JP)

(73) Assignee: SUMITOMO WIRING SYSTEMS, LTD., Mie (ES)

( * ) Notice: Subject to any disclaimer, the term of this patent is extended or adjusted under 35 U.S.C. 154(b) by 0 days.

(21) Appl. No.: 14/430,080

(22) PCT Filed: Jun. 12, 2013

(86) PCT No.: PCT/JP2013/066159
§ 371 (c)(1),
(2) Date: Mar. 20, 2015

(87) PCT Pub. No.: WO2014/050223
PCT Pub. Date: Apr. 3, 2014

(65) Prior Publication Data
US 2015/0235737 A1  Aug. 20, 2015

(30) Foreign Application Priority Data
Sep. 26, 2012 (JP) .................. 2012-211869

(51) Int. Cl.
*H01B 7/38* (2006.01)
*H01B 7/17* (2006.01)
*H01B 7/00* (2006.01)

(52) U.S. Cl.
CPC ............... *H01B 7/38* (2013.01); *H01B 7/0045* (2013.01); *H01B 7/17* (2013.01)

(58) Field of Classification Search
CPC ........... H01B 7/38; H01B 7/0045; H01B 7/17

USPC ....................................... 174/72 A
See application file for complete search history.

(56) References Cited

U.S. PATENT DOCUMENTS 2,023,030 A * 12/1935 Plunkett ............... B65B 61/182
206/321
3,312,250 A * 4/1967 Sirignano ............... B29C 65/08
138/128

(Continued)

FOREIGN PATENT DOCUMENTS

| JP | 2010-225328 | 10/2010 |
|---|---|---|
| JP | 2012-110101 | 6/2012 |
| WO | 2011/136199 | 11/2011 |

OTHER PUBLICATIONS

Search report from PCT/JP2013/066159, mail date is Jul. 9, 2013.

*Primary Examiner* — Michael F McAllister
(74) *Attorney, Agent, or Firm* — Greenblum & Bernstein, P.L.C.

(57) ABSTRACT

The purpose of the present invention is to provide a wire harness which allows only the nonwoven fabric exterior structure to be disassembled without damaging an interior wire bundle. A wire harness according to the present invention has a nonwoven fabric exterior structure obtained by heat-molding while a wire bundle is wound with the nonwoven fabric. The nonwoven fabric exterior structure protects a part of the outer periphery of the wire bundle. The wire harness is provided with a paper tape that is provided with a part thereof exposed from the outer peripheral surface of the nonwoven fabric exterior structure. The paper tape is heat-molded together with the nonwoven fabric with the tip sticking out from the winding end edge so that the base portion of the tip exposed from the outer peripheral surface of the nonwoven fabric exterior structure shows the position of the winding end edge.

3 Claims, 5 Drawing Sheets

(56) References Cited

U.S. PATENT DOCUMENTS

| | | | | |
|---|---|---|---|---|
| 3,748,371 A * | 7/1973 | Krook | H01B 7/184 | 174/10 |
| 4,041,237 A * | 8/1977 | Stine | H01B 3/44 | 174/10 |
| 5,173,961 A * | 12/1992 | Chiasson | G02B 6/443 | 385/112 |
| 5,469,523 A * | 11/1995 | Blew | G02B 6/4403 | 385/101 |
| 6,704,481 B2 * | 3/2004 | Gaillard | H01B 7/385 | 385/113 |
| 6,798,957 B2 * | 9/2004 | Engel | G02B 6/4495 | 385/109 |
| 7,523,532 B2 * | 4/2009 | Yamaguchi | B60R 16/0215 | 28/110 |
| 7,692,092 B2 * | 4/2010 | Schoke | H02G 3/0412 | 174/36 |
| 2001/0029814 A1 * | 10/2001 | Tiano | G02B 6/4497 | 81/119 |
| 2001/0043781 A1 * | 11/2001 | Yokokawa | G02B 6/4495 | 385/102 |
| 2010/0018711 A1 * | 1/2010 | James | F16L 13/0272 | 166/305.1 |
| 2013/0037321 A1 | 2/2013 | Murata et al. | | |

\* cited by examiner

PRIOR ART

Fig. 6

PRIOR ART

PRIOR ART

PRIOR ART

WIRE HARNESS

FIELD OF THE INVENTION

The present invention relates to a wire harness that has a nonwoven fabric exterior structure, in particular to disassembly easiness of the nonwoven fabric exterior structure.

BACKGROUND OF THE INVENTION

As an on-vehicle wire harness, there is a wire harness that has a nonwoven fabric exterior structure that is formed by heat-molding (hot pressing) a nonwoven fabric in a state covering a wire bundle. As the nonwoven fabric exterior structure, for example, there is a wire protection member disclosed in Patent Literature 1.

Figure 5:
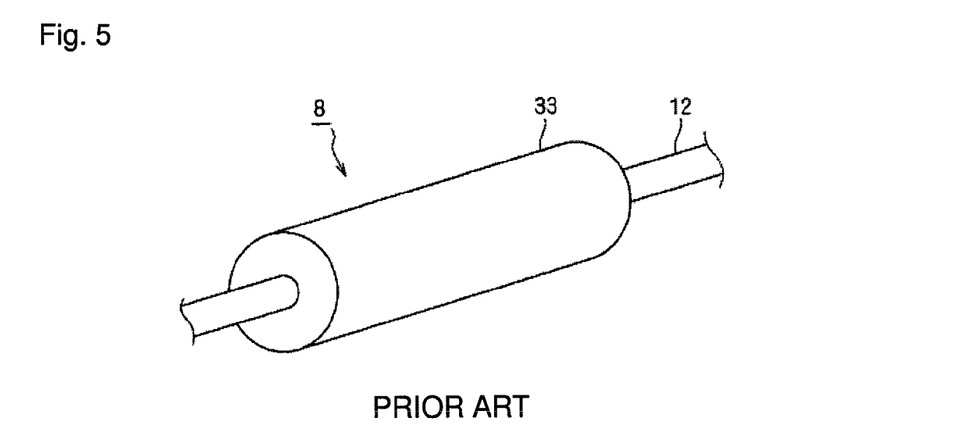
FIG. 5 illustrates an explanatory diagram illustrating a conventional wire harness that has a nonwoven fabric exterior structure.

FIG. 5 illustrates an explanatory diagram illustrating a conventional wire harness that has a nonwoven fabric exterior structure. As illustrated in FIG. 5, a wire harness 8 has a nonwoven fabric exterior structure 33 that is formed covering a portion of an outer periphery of a wire bundle 12.

Figure 6:
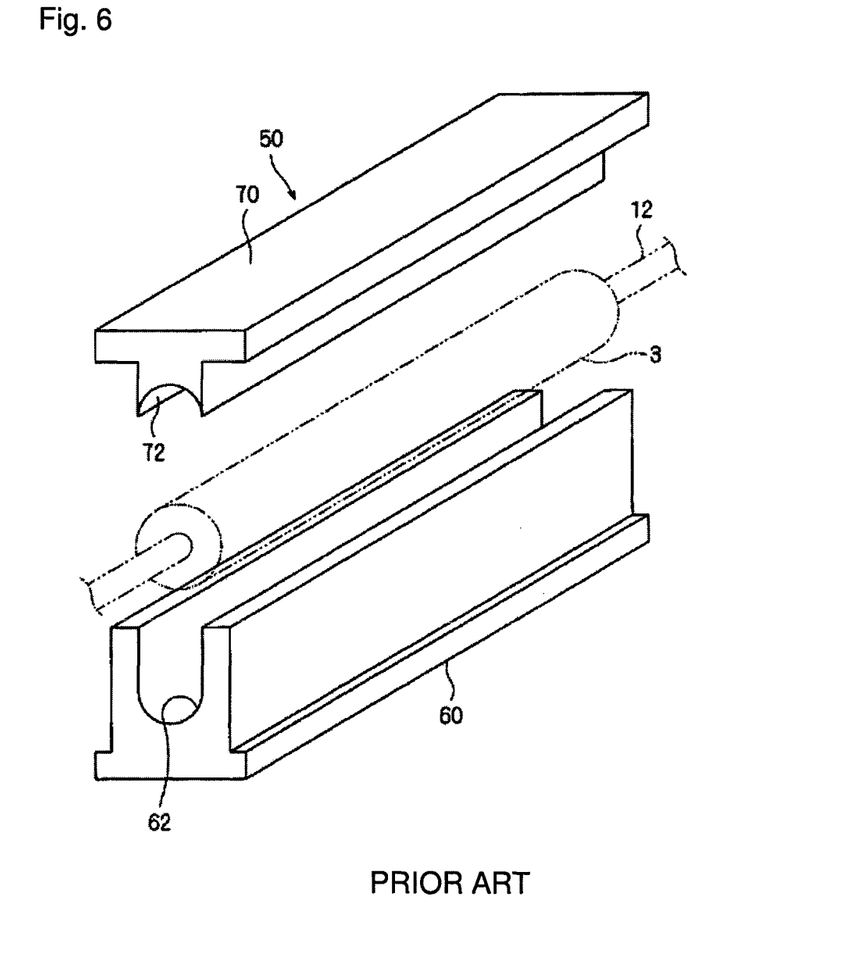
FIG. 6 illustrates explanatory diagram illustrating a manufacturing method (part 1) of the conventional wire harness.
Figure 7A:
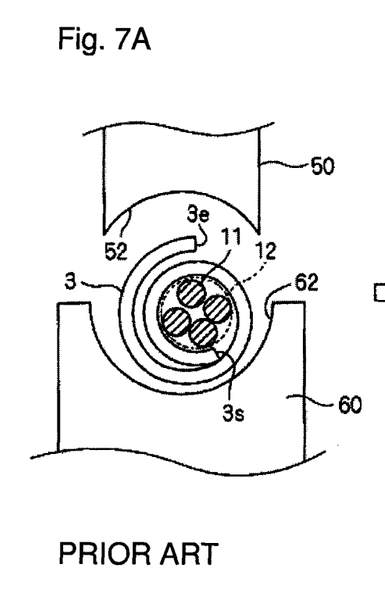
FIGS. 7A and 7B illustrate an explanatory diagram illustrating the manufacturing method (part 2) of the conventional wire harness.
Figure 7B:
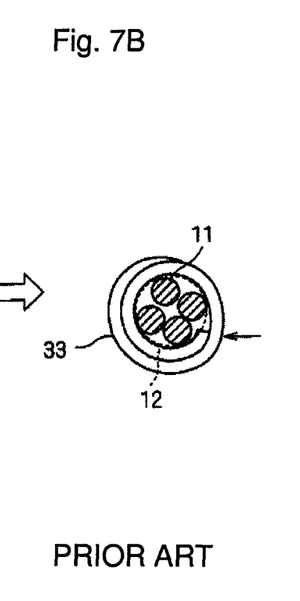

FIGS. 6, and 7A, 7B illustrate explanatory diagrams illustrating a manufacturing method of the conventional wire harness 8. In the following, with reference to FIGS. 6 and 7A, 7B, the manufacturing method of the conventional wire harness 8 is described.

As illustrated in FIG. 6, a hot press mold 50 that is used in order to obtain the nonwoven fabric exterior structure 33 has a lower mold 60 and an upper mold 70.

The lower mold 60 is a long member that is formed of a metal and the like having excellent thermal conductivity. A lower mold surface 62 is formed on one main surface (upper surface) of the lower mold 60. Schematically, the lower mold surface 62 is formed in a groove shape that opens upward and on both end sides. The lower mold surface 62 is formed to have a length in a longitudinal direction that is the same as a length of a to-be-protected portion (portion to be covered by the nonwoven fabric exterior structure 33) of the wire bundle 12.

Further, bottoms of two ends of the lower mold surface 62 in the longitudinal direction are formed to have a semi-circular cross section that has an inner diameter corresponding to an external shape of the nonwoven fabric exterior structure 33.

The upper mold 70 is a long member that is formed of a metal and the like having excellent thermal conductivity. On one main surface (lower surface) of the upper mold 70, an upper mold surface 72 is formed in a groove shape having an arc-shaped cross section. The upper mold surface 72 is formed to have a width that allows the upper mold surface 72 to be arranged inside the lower mold surface 62 while allowing the upper opening of the lower mold surface 62 to be filled. A lower surface of the upper mold surface 72 is formed to have a semi-circular cross section that has an inner diameter corresponding to the external shape of the nonwoven fabric exterior structure 33.

By arranging the upper mold surface 72 inside the lower mold surface 62, a space that allows the nonwoven fabric exterior structure 33 to be formed is formed between the upper mold surface 72 and the lower mold surface 62. A heating mechanism (not illustrated in the drawings) such a heater is provided in the lower mold 60 and the upper mold 70.

In the following, a method for manufacturing the nonwoven fabric exterior structure 33 from a nonwoven fabric 3 before molding, using the above-described hot press mold 50, is specifically described.

First, a portion of the wire bundle 12 in a state of being wound with the nonwoven fabric 3 is arranged in the lower mold surface 62 of the lower mold 60.

Specifically, as illustrated in FIG. 7A, the wire bundle 12 oriented along the longitudinal direction in a state where the nonwoven fabric 3 is wound around the wire bundle 12 (configured by a plurality of wires 11) is arranged in the lower mold surface 62. In this case, a winding start edge 3s of the nonwoven fabric 3 is temporarily fixed using a double-sided tape or the like (not illustrated in the drawings) on the wire bundle 12, and a winding end edge 3e of the nonwoven fabric 3 is temporarily fixed via a double-sided tape (not illustrated in the drawings) on an outer peripheral surface of an already-wound portion of the nonwoven fabric 3.

Thereafter, the upper mold surface 72 of the upper mold 70 is inserted into the lower mold surface 62. In this state, the nonwoven fabric 3 is heat-molded (hot-pressed) inside the hot press mold 50. That is, in a state where the nonwoven fabric 3 is pressed between the lower mold surface 62 and the upper mold surface 72, the nonwoven fabric 3 is heated.

Thereafter, when the nonwoven fabric 3 is cooled, a surface of the nonwoven fabric 3 is cured in a shape corresponding to the shapes of the lower mold surface 62 and the upper mold surface 72. Further, overlapping portions of the nonwoven fabric 3 are in a close contact state of being mutually bonded. In this way, the nonwoven fabric exterior structure 33 in a state of covering the wire bundle 12 is formed and the wire harness 8 having the nonwoven fabric exterior structure 33 illustrated in FIG. 5 is completed.

RELATED ART

Patent Literature

Patent Literature 1: Japanese Patent Laid-Open Publication No. 2012-110101.

SUMMARY OF THE INVENTION

Problems to be Solved by the Invention

However, in the nonwoven fabric exterior structure 33, the overlapping portions of the nonwoven fabric 3 before heat-molding are in the close contact state of being mutually bonded. Therefore, it is impossible to visually recognize the winding end edge 3e, and it is extremely difficult to disassemble the nonwoven fabric exterior structure 33 without damaging the interior wire bundle 12.

Therefore, there is a situation where, when the wire harness 8 is manufactured by erroneously attaching the nonwoven fabric exterior structure 33 to the wire bundle 12 due to a dimensional error of the nonwoven fabric exterior structure 33, defective attachment to the wire bundle 12, or the like, it becomes necessary to discard the nonwoven fabric exterior structure 33, of course, and also the wire bundle 12 that is to be protected, and as a result, the wire bundle 12 cannot be reused.

The present invention is made to solve the above circumstances and is aimed to obtain a wire harness that allows only a nonwoven fabric exterior structure to be disassembled without damaging an interior wire bundle.

Means for Solving the Problems

A wire harness according to a first aspect of the present invention includes: a wire bundle; a nonwoven fabric exterior structure that is formed by being heat-molded in a state where a nonwoven fabric covers the wire bundle, and has a nonwoven fabric edge during molding; and an auxiliary member that is formed on an outer peripheral surface of the nonwoven fabric exterior structure so that a formation position of the nonwoven fabric edge can be visually recognized. The nonwoven fabric exterior structure has a structure that is obtained by performing heat-molding in a state where the wire bundle is wound with the nonwoven fabric, and the nonwoven fabric edge has a winding end edge that is formed on an outer peripheral surface along a longitudinal direction of the wire bundle.

According to a third aspect of the present invention, which relates to the wire harness of the first aspect of the present invention, the auxiliary member has a tape material that is formed to have one end exposed from the winding end edge and the other end embedded inside the nonwoven fabric exterior structure.

According to a fourth aspect of the present invention, which relates to the wire harness of the third aspect of the present invention, the other end of the tape material is arranged to be in contact with a portion of the wire bundle.

Effect of the Invention

The wire harness according to the first aspect of the present invention includes the auxiliary member that is formed on the outer peripheral surface of the nonwoven fabric exterior structure so that the formation position of the nonwoven fabric edge can be visually recognized. Therefore, by inserting a jig for disassembly from the nonwoven fabric edge that is visually recognized from the auxiliary member, a disassembly operation to remove only the nonwoven fabric exterior structure can be relatively easily performed.

As a result, without damaging the interior wire bundle, by disassembling only the nonwoven fabric exterior structure, the interior wire bundle after the disassembly can be reused.

In addition, according to the first aspect of the present invention, with respect to the nonwoven fabric exterior structure that is heat-molded in the state in which the wire bundle is wound with the nonwoven fabric, by inserting a jig for disassembly from the winding end edge that is recognized with reference to the auxiliary member, a disassembly operation to remove only the nonwoven fabric exterior structure can be relatively easily performed.

According to the third aspect of the present invention, the other end of the tape material is embedded inside the nonwoven fabric exterior structure and the one end is exposed from the winding end edge. Therefore, a region where the tape material exists at the winding end edge becomes a non-close contact region where overlapping portions of the nonwoven fabric are not in close contact with each other even after the heat-molding.

Therefore, since a jig for disassembly can be relatively easily inserted from the non-close contact region, a disassembly operation to remove only the nonwoven fabric exterior structure can be relatively easily performed.

In addition, the tape material can be easily cut. Therefore, when disassembly of the nonwoven fabric exterior structure is not necessary, by cutting and removing the exposed portion of the tape material, appearance of the wire harness is not undermined.

According to the fourth aspect of the present invention, the other end of the tape material is arranged in contact with a portion of the wire bundle. Therefore, by using a path extending from one end to the other end of the tape material as a path for the disassembly of the nonwoven fabric exterior structure, the disassembly operation can be efficiently performed.

The purpose, features, aspects and advantages of the present invention will be made clearer by the following detailed description and the accompanying drawings.

MODE FOR CARRYING OUT THE INVENTION

Figure 1:
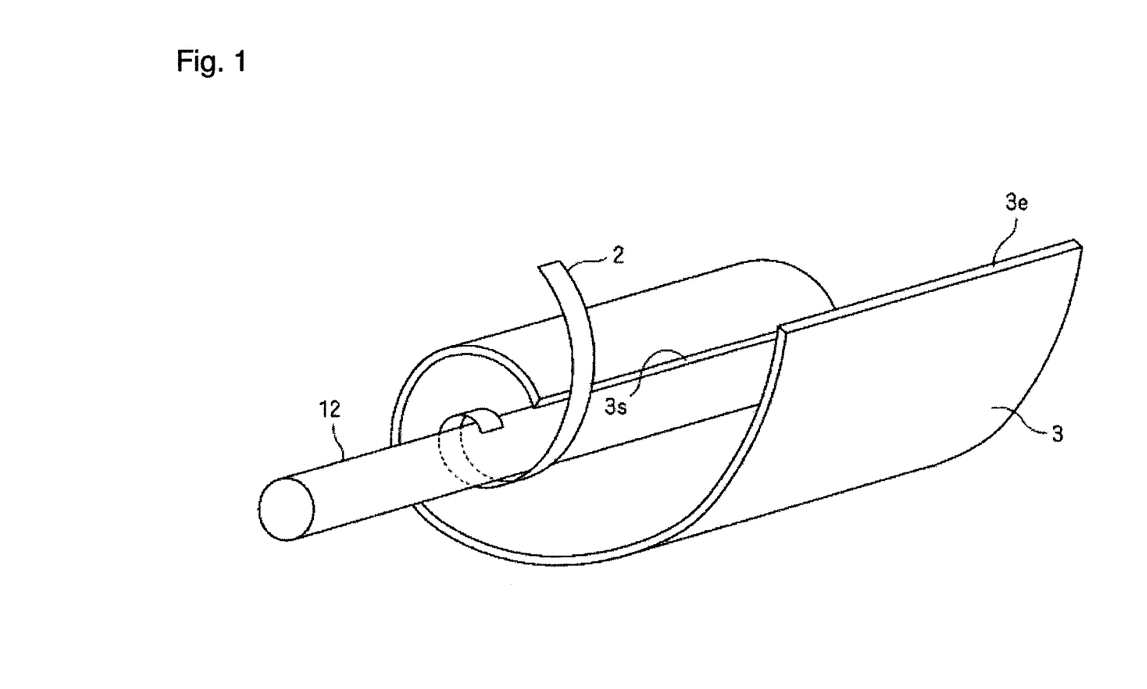
FIG. 1 illustrates an explanatory diagram illustrating a part of a manufacturing process of a wire harness of the present embodiment.
Figure 2A:
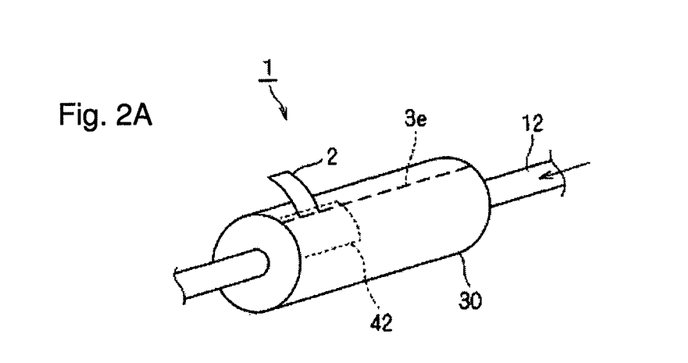
FIGS. 2A and 2B illustrate an explanatory diagram illustrating the wire harness in a completed state.
Figure 2B:
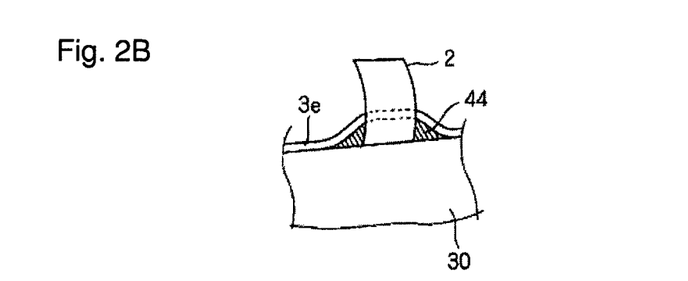
Figure 3:
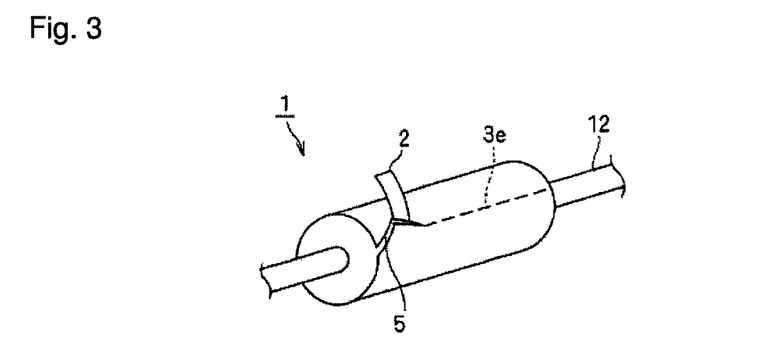
FIG. 3 illustrates an explanatory diagram illustrating a situation at start of a disassembly operation of a nonwoven fabric exterior structure of the wire harness.

FIG. 1 illustrates an explanatory diagram illustrating a part of a manufacturing process of a wire harness 1 of the present embodiment. FIGS. 2A, 2B illustrate an explanatory diagram illustrating the wire harness 1 in a completed state. FIG. 3 illustrates an explanatory diagram illustrating a situation at start of a disassembly operation with respect to a nonwoven fabric exterior structure 30 of the wire harness 1.

As illustrated in FIGS. 2A, 2B, similar to the nonwoven fabric exterior structure 33 illustrated in FIGS. 6 and 7A, 7B, the wire harness 1 has the nonwoven fabric exterior structure 30 that is formed by heat-molding a nonwoven fabric 3 in a state of being wound around a wire bundle 12. An outer periphery of a portion of the wire bundle 12 is protected by the nonwoven fabric exterior structure 30.

Therefore, the nonwoven fabric exterior structure 30 has a winding end edge 3e (nonwoven fabric edge) that is formed on an outer peripheral surface of the nonwoven fabric exterior structure 30 along a longitudinal direction of the wire bundle 12. However, during heat-molding, overlapping portions of the nonwoven fabric 3 are in a close contact state of being mutually bonded. Therefore, the winding end edge 3e itself cannot be visually recognized.

Therefore, as illustrated in FIG. 1, when the wire bundle 12 is wound with the nonwoven fabric 3 from a winding start edge 3s to the winding end edge 3e before heat-molding, the wire bundle 12 is also wound with a paper tape 2 of a tape material that acts as an auxiliary member. In this case, by performing heat-molding in a state where a front end portion of the paper tape 2 sticks out from the winding end edge 3e, as illustrated in FIG. 2A, one end of the paper tape 2 is exposed from the winding end edge 3e, and the other end is embedded inside the nonwoven fabric exterior structure 30.

By temporarily fixing one end of the paper tape 2 in a state of sticking out from the winding end edge 3e of the nonwoven fabric 3 using a double-sided tape or the like on an outer peripheral surface of an already-wound portion of the nonwoven fabric 3 during heat-molding, after the wire harness 1 is completed, the one end of the paper tape 2 can be reliably exposed from the winding end edge 3e.

Therefore, a base position of the paper tape 2 that is exposed from the outer peripheral surface of the nonwoven fabric exterior structure 30 is certainly a position of the winding end edge 3e. Therefore, by referring to the paper tape 2, the winding end edge 3e can be accurately visually recognized.

Therefore, by accurately inserting a jig (such as a jig of a butter knife shape) for disassembly from the winding end edge 3e, as illustrated in FIG. 3, by expanding a disassembling space 5 from a base portion of the paper tape 2 of the winding end edge 3e, a disassembly operation to remove only the nonwoven fabric exterior structure 30 can be relatively easily performed.

As a result, without damaging the interior wire bundle 12, by disassembling only the nonwoven fabric exterior structure 30, the interior wire bundle 12 after the disassembly can be reused.

Further, due to the presence of the paper tape 2, a portion of the winding end edge 3e cannot be in close contact with an overlapping portion of the nonwoven fabric 3 before heat-molding. Therefore, as illustrated in FIG. 2B, which illustrates an enlarged view of a peripheral region of the paper tape of FIG. 2A, a gap 44 of a non-close contact region is formed between the paper tape 2 of the winding end edge 3e and a surrounding region thereof.

Therefore, since a jig for disassembly can be easily inserted from the gap 44, a disassembly operation to remove only the nonwoven fabric exterior structure 30 can be relatively easily performed. Further, when the gap 44 is relatively broad, a manual disassembly is also possible without using a jig.

Further, the paper tape 2 can be easily cut. Therefore, when disassembly of the nonwoven fabric exterior structure 30 is not necessary, by cutting and removing the exposed portion of the paper tape 2, appearance of the wire harness 1 is not undermined.

Further, as illustrated in FIG. 1, by arranging the other end of the paper tape 2 in contact with a portion of the wire bundle 12, a path extending from one end to the other end of the paper tape 2 can be used as a path for the disassembly of the nonwoven fabric exterior structure 30 that has been heat-molded by winding. Thereby, the disassembly operation of the nonwoven fabric exterior structure 30 can be more efficiently performed.

By temporarily fixing the other end of the paper tape 2 to a portion of the wire bundle 12 using a double-sided tape or the like during heat-molding, the other end of the paper tape 2 can be reliably arranged to be in contact with the portion of the wire bundle 12, after the wire harness 1 is completed.

Other Embodiment

Figure 4:
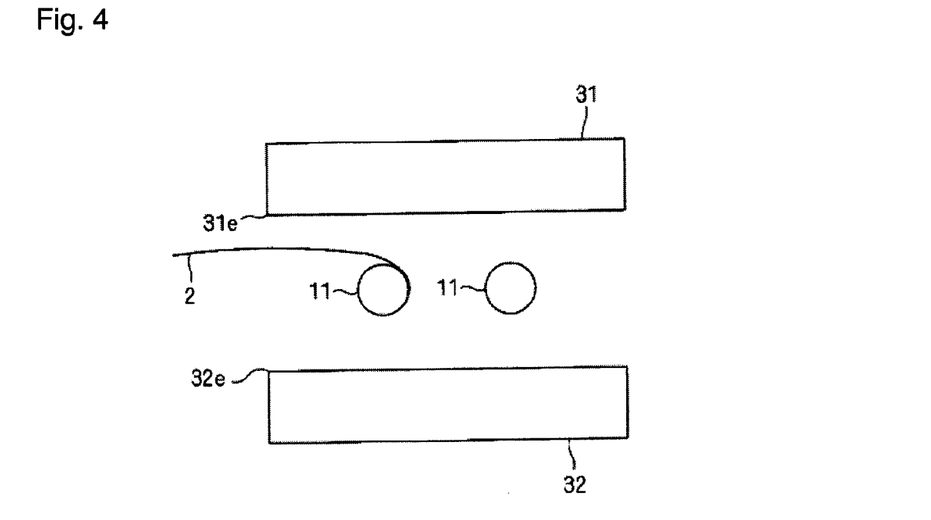
FIG. 4 illustrates an explanatory diagram illustrating another embodiment of a heat-molding process for obtaining a nonwoven fabric exterior structure.

In FIGS. 1-3, the nonwoven fabric exterior structure 30 is illustrated that is obtained by performing heat-molding in the state in which the wire bundle 12 is wound with the nonwoven fabric 3. However, a nonwoven fabric exterior structure that is heat-molded in another embodiment is also applicable. FIG. 4 illustrates an explanatory diagram illustrating another embodiment of a heat-molding process for obtaining a nonwoven fabric exterior structure.

As illustrated in FIG. 4, in the other embodiment, a heat-molding process is performed in a state where a wire bundle 12 that is configured by a plurality of wires 11 is sandwiched from above and below by an upper nonwoven fabric member 31 and a lower nonwoven fabric member 32. In the case of the other embodiment illustrated in FIG. 4, by performing heat-molding in a state where, while the other end of a paper tape 2 is in contact with one wire 11 (which is possible by temporarily fixing the other end of the paper tape 2 to the one wire 11 using a double-sided tape or the like), one end of the paper tape 2 sticks out from a close-contact front end portion (a nonwoven fabric edge) between a lower end 31e of the upper nonwoven fabric member 31 and an upper end 32e of the lower nonwoven fabric member 32, a base portion of the exposed paper tape 2 is certainly the close-contact front end portion.

Therefore, by accurately inserting a jig for disassembly from the close-contact front end, similar to the nonwoven fabric exterior structure 30 illustrated in FIGS. 1-3, a disassembly operation to remove only the nonwoven fabric exterior structure can be relatively easily performed.

In the other embodiment, there is a possibility that the portion of the paper tape 2 exposed from the close-contact front end between the lower end 31e and the upper end 32e is cut during heat-molding. However, even in this case, when a remaining portion of the paper tape 2 can be recognized from an outer peripheral surface of the nonwoven fabric exterior structure 33, the above-described effect can be achieved.

MISCELLANEOUS

In the present embodiment, the relatively inexpensive paper tape 2 as a tape material is illustrated. However, other than the paper tape 2, any tape material can be alternatively used that allows an exposed portion thereof to be easily removed after the nonwoven fabric exterior structure 30 is formed, without adversely affecting the formation of the nonwoven fabric exterior structure 33 during heat-molding. For example, a cloth tape (such as a flatly-spread shoelace-like tape) can be considered as a substitute for the paper tape 2. A cloth tape is less likely to be cut than a paper tape and thus is superior in stability in the case where the above-described path for disassembly is formed as compared to a paper tape. Further, it is also possible to use an adhesive tape having adhesiveness on both sides or on one side. In this case, the adhesive tape can temporarily fix itself on the outer peripheral surface of the nonwoven fabric 3 and on the wire bundle 12 during heat-molding.

Within the scope of the present invention, modifications and omissions with respect to the embodiments can be suitably made.

DESCRIPTION OF REFERENCE NUMERALS

1 Wire harness
2 Paper tape
3 nonwoven fabric
11 wire
12 wire bundle
30 nonwoven fabric exterior structure

The invention claimed is:

1. A wire harness comprising:
a wire bundle;
a nonwoven fabric exterior structure that is formed by being heat-molded in a state where a nonwoven fabric covers the wire bundle, and has a nonwoven fabric edge during molding; and
an auxiliary member that is formed on an outer peripheral surface of the nonwoven fabric exterior structure so that a formation position of the nonwoven fabric edge can be visually recognized, the auxiliary member extends circumferentially around the wire bundle on an inner surface of the nonwoven fabric exterior structure between the wire bundle and the nonwoven fabric exterior structure, wherein the nonwoven fabric exterior structure has a structure that is obtained by performing heat-molding in a condition in which the wire bundle is wound with the nonwoven fabric, and the nonwoven fabric edge has a winding end edge that is formed on an outer peripheral surface along a longitudinal direction of the wire bundle.

2. The wire harness according to claim 1, wherein the auxiliary member has a tape material that is formed to have one end exposed from the winding end edge and the other end embedded inside the nonwoven fabric exterior structure.

3. The wire harness according to claim 2, wherein the other end of the tape material is arranged to be in contact with a portion of the wire bundle.

* * * * *